Feb. 28, 1933.                W. L. ADAMS                1,899,908
                              FISHING REEL
                           Filed Feb. 14, 1928

INVENTOR
WALTER L. ADAMS.
BY Ely & Barrow
ATTORNEYS.

Patented Feb. 28, 1933

1,899,908

UNITED STATES PATENT OFFICE

WALTER L. ADAMS, OF AKRON, OHIO, ASSIGNOR TO THE ENTERPRISE MANUFACTURING COMPANY, OF AKRON, OHIO, A CORPORATION OF OHIO

FISHING REEL

Application filed February 14, 1928. Serial No. 254,188.

This invention relates to fishing reels of the level wind type in which the reel structure is provided with a removable level wind mechanism attached to the reel structure and removable therefrom without disassembling the main body of the reel structure.

Reels of the level wind type are usually provided with an operating crank and pinion located intermediate and in mesh with the spool pinion and the pinion which is carried upon the screw-threaded traversing shaft for the level wind carriage. In large fishing reels for salt water fishing, for which the present invention is particularly adapted, the strains and pressure in reeling in large fish is tremendous, and is applied directly at the point where the operating crank is located.

The object of the present invention is to provide a brace or stay for the end plates of a fishing reel located at the point therein where it will best withstand the pressure applied at the operating crank. For this purpose the inventor prefers to use the removable level winding mechanism and to so fashion the parts of the level winding mechanism that it will operate as an effective reinforcement for the reel structure.

The showing made herein is detailed and complete in order that the features of the invention may be fully understood, but the invention is not limited to conformity with the details as shown and described, variations and modifications being possible within the scope of the claims as defined by a fair interpretation thereof and by the prior art.

In the drawing in which the best known form of the invention is illustrated,

Figure 2:
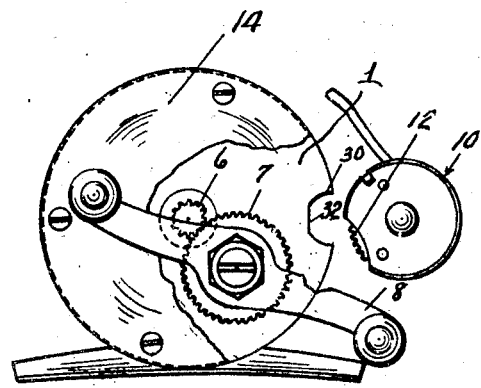
Figure 2 is an end view of the reel structure with the gear housing partly broken away with the level wind mechanism detached from the reel structure.
Figure 1:
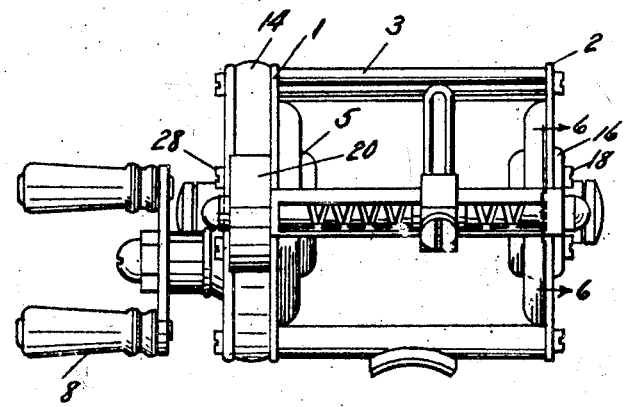
Figure 1 is a side elevation of a reel structure embodying the features of the invention.
Figures 3, 4:
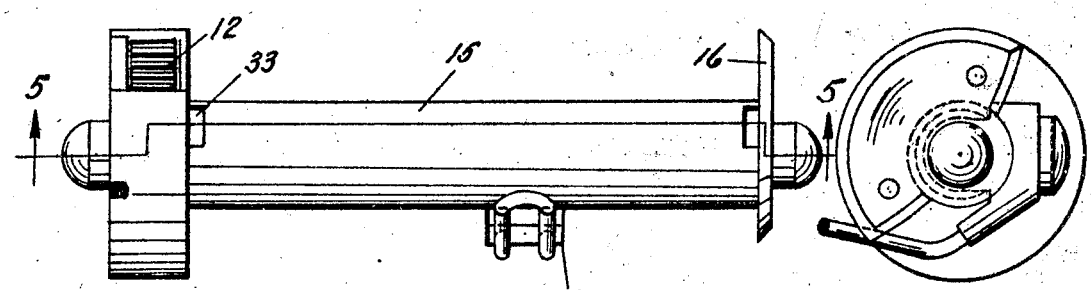
Figure 3 is an enlarged view of the level wind mechanism looking from the side and top.
Figure 4 is an end view thereof.

The reel structure may be made in many different forms and modifications, but for the purpose of illustrating one embodiment of the invention, the reel structure shown in the Adams and Pflueger Patent No. 1,691,622, dated November 13, 1928, is illustrated and will be described.

This structure comprises two end plates, the front plate 1 and the rear plate 2, which are held together by a plurality of posts 3 forming the usual housing for the reel spool 5. The spool is connected to a pinion 6 which is driven from the main driving gear 7 operated by the crank 8. The level winding mechanism which is indicated as an entirety by the numeral 10 is operated by a pinion 12 which meshes with the main driving gear 7. The gearing for driving the spool and the level winding mechanism is housed in a removable casing 14 which is secured to the front plate 1.

The removable level wind mechanism proper is contained in a tubular housing 15 which extends the entire width of the reel structure and having a semi-circular flange 16 at its rear end which fits against the outer face of the back plate 2 being fastened with screws 18. The front end of the housing 15 is formed with a circular housing 20 which surrounds the gear 12 and fits between the front plate 1 and the casing 14, the housing being cut away to permit the meshing of the gears 7 and 12. The flange 16 is formed with a bearing 22 and the housing 20 with a removable disk 23 having a bearing 24 therein for the screw-threaded shaft 26 which operates the line guide carriage 27, the shaft being driven by the gear 12. The forward end of the removable carriage is held in place by screws 28 extending through casing 14 which screw into the disk 23.

Detailed description of the level winding mechanism, other than has been given is unnecessary to an understanding of the present invention.

Figure 5:
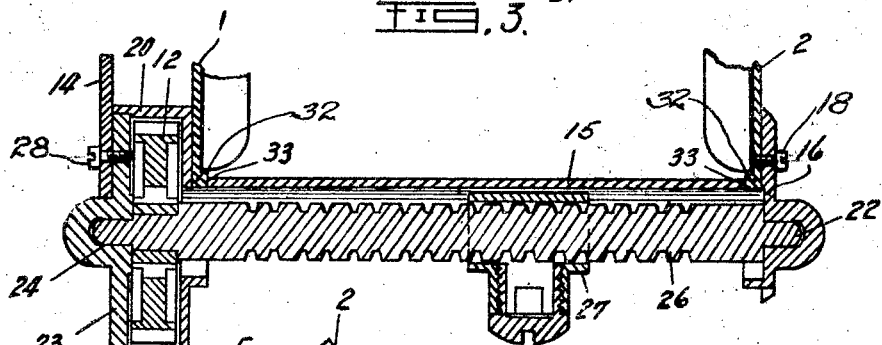
Figure 5 is a section on the line 5—5 of Figure 3 showing the level wind mechanism attached to the reel.
Figure 6:
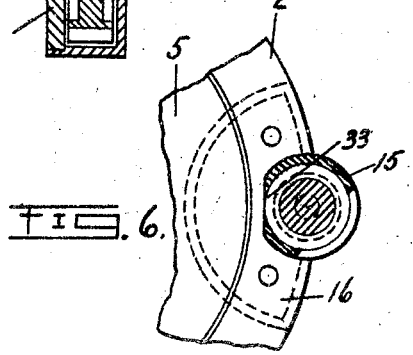
Figure 6 is an enlarged section on the line 6—6 of Figure 1.

The tubular housing 15 of the level wind mechanism is removable with the entire mechanism contained therein, upon the removal of screws 18 and 28, as shown in Figure 2. The housing 15 is seated in notches 30 in the end plates. In the prior construction referred to, as shown in the patent, the notches were fully semi-circular in shape and fitted around the tubular casing. In the present invention, the base of the notch in each end plate is provided with a thickened chordal fillet 32 and the tubular housing 15 with slots 33 which fit over the fillets 32 as shown in Figures 5 and 6. The end plates and housing are thereby interlocked with each other by the interengagement of the fillets 32 of said plates with the slots 33 of the tubular housing 15 so that the housing braces and keeps the end plates at fixed distances apart, and withstands lateral pressure upon both sides of the reel. As this brace is located immediately adjacent the operating crank, it is very effective and braces that side of the reel where the pressure is greatest. This is a considerable improvement over prior reel structures of this type, particularly where the reel is adapted and intended for deep sea fishing. The result is obtained with a removable line-guiding and level-winding device, which serves its own particular function and also reenforces and strengthens the reel structure. The walls of the slots 33 constitute abutments in the tubular casing against which the end plates bear to maintain them in proper spaced relationship. It is possible to obtain satisfactory bracing with the engagement between the front plate and the tubular casing only, the bracing being effected through the screw-threaded connection on the rear plate only, but this may not be quite so effective as the double engagement between the casing and both end plates.

What is claimed is:

1. In a fishing reel structure, front and back plates, an operating crank on the front plate, a housing extending between the front and back plates, a level wind mechanism enclosed within the housing, said housing being removably secured to the plates and interlocked therewith, whereby the housing braces the plates and maintains them at a fixed distance apart.

2. In a fishing reel structure, front and back plates, an operating crank mounted on the front plate, a level wind mechanism removably secured to the plates and removable from the reel structure without disassembling it, said level wind mechanism being constructed to interlock with the plates and maintain them at a fixed distance apart.

3. In a fishing reel structure, front and back plates, an operating crank mounted on the front plate, a level wind mechanism, screw means for removably securing said mechanism to the plates so that it is removable from the reel structure without disassembling the plates, said level wind mechanism including a housing so constructed as to interlock with the front plate, and connections between the housing and the back plate for transmitting pressure on the front plate through the housing to the back plate.

4. In a fishing reel structure, front and back plates, an operating crank mounted on the front plate, a level wind mechanism removably secured to the plates and removable from the reel structure without disassembling the plates, said level wind mechanism including a housing, a slot in the housing in which the front plate is received, and connections between the housing and the back plate for transmitting pressure on the front plate through the housing to the back plate.

5. In a fishing reel structure, front and back plates, an operating crank mounted on the front plate, a level wind mechanism removably secured to the plates and removable from the reel structure without disassembling the plates, said level wind mechanism including a housing, and slots in the housing with which the end plates engage.

6. In a fishing reel structure, front and back plates, an operating crank mounted on the front plate, said plates being provided with notches in their edges, a removable housing seated in said notches, a level wind mechanism carried by the housing, the base of the notch in the front plate being provided with a fillet, and the housing having a slot therein in which the fillet is received, so that the pressure upon the front plates is carried by the housing.

7. In a fishing reel structure, front and back plates, an operating crank mounted on the front plate, said plates being provided with notches in their edges, a removable housing seated in said notches, a level wind mechanism carried by the housing, the bases of the notches in the plates being provided with fillets, and the housing having slots therein in which the fillets are received, so that the plates are maintained at a fixed distance.

WALTER L. ADAMS.